United States Patent Office 3,147,589
Patented Sept. 8, 1964

3,147,589
3-CYCLOPROPYLNORCARANE AS A
HIGH ENERGY FUEL
John C. James, Melrose, Mass., assignor to Monsanto
Research Corporation, St. Louis, Mo., a corporation of
Delaware
No Drawing.   Filed June 11, 1962, Ser. No. 201,325
5 Claims.   (Cl. 60—35.4)

This invention relates to high energy fuels. More particularly, this invention relates to methods of developing thrust and to methods of operating reaction type power plants. This invention especially contemplates a high energy fuel composition comprising 3-cyclopropylnorcarane as an essential ingredient.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbojet, or pulse-jet engine, exhaustion of the high temperature gases is directed in a rearward direction to produce a true jet propulsion. In a turbine type engine, such as a gas-turbine or a turbo-prop engine, the exhaustion of the high temperature gases is directed into a turbine which drives a propeller or other mechanical means for developing a forward thrust. Reaction power plants may be used in widely different types of vehicles such as in space ships, aircraft, boats, guided missiles, automobiles and the like.

Heretofore it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher, but the presently available JP-4 fuel is thermally stable to a temperature of only about 400° F. Therefore, it is desirable to have a fuel which is thermally stable at temperatures at least as high as 500° F.

Another serious disadvantage of the prior art known fuels is the low heat of combustion of such fuels. Aircraft generally, and particularly military aircraft, are being designed for higher and higher speeds requiring higher energy level fuels. The fuel must not only have a high energy level on a weight basis or high B.t.u./lb., but also a high energy level on a volume basis or a high B.t.u./gal., since wing sections are being made thinner in order to reduce drag and the space for storage of fuel is limited. Thus, aircraft are very often volume-limited as well as weight-limited for the storage of fuel. Aircraft are particularly volume limited using the currently available JP-6 high energy fuel which has a heat of combustion of 18,400 B.t.u./lb. on a weight basis, but a heat of combustion of only 119,500 B.t.u./gal. on a volume basis. Therefore, it is particularly desirable to provide a high energy fuel having a high heat of combustion on a volume basis, preferably greater than 120,000 B.t.u./gal., and at the same time obtain the other characteristics necessary for a good fuel of this type.

An object of this invention is to provide high energy fuel compositions for use in reaction type power plants.

Another object of this invention is to provide improved methods of developing thrust.

Another object of this invention is to provide improved methods of operating reaction type power plants, particularly jet propulsion type engines, including rocket, ram-jet, turbo-jet, and pulse-jet engines, and turbine type engines, including turbo-prop and gas-turbine engines.

Another object of this invention is to provide 3-cyclopropylnorcarane as a new compound.

A further object is to provide a process for preparing 3-cyclopropylnorcarane.

These and other objects are attained by reacting carbene with 4-vinylcyclohexene to prepare 3-cyclopropylnorcarane and oxidizing a high energy fuel comprising, as an essential ingredient, 3-cyclopropylnorcarane in a reaction chamber to produce a mass of high temperature gases exhaustible from said chamber in a manner developing high thrust.

3-cyclopropylnorcarane is a hydrocarbon having the following structural formula

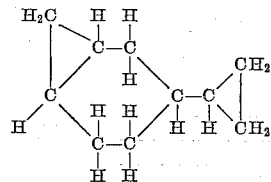

and the empirical formula: $C_{10}H_{16}$.

It may be prepared by reacting 4-vinyl cyclohexene with a carbene, $CH_2=$, which is advantageously prepared from diiodomethane and a zinc-copper couple as described by H. E. Simmons and R. D. Smith in J.A.C.S. 80, 5323 (1958), and 81, 4256 (1959). The term "carbene" has been used for about ten years to indicate the transient

radical. This terminology is recognized by Chemical Abstracts based primarily on J.A.C.S. 76, 6162 (1954), and papers referenced therein.

The zinc-copper couple is prepared for the carbenation reaction by heating a mixture containing from 75 to 95 weight percent zinc and, correspondingly from 25 to 5 weight percent copper in a hydrogen atmosphere at a temperature in the range of 425° C. to 475° C. for a period of from 4 to 6 hours. In the formation of the zinc-copper couple, the first part of the reaction is highly exothermic and care must be taken to avoid heating the mixture much above 475° C. The carbenation reaction is carried out in an inert solvent medium, such as, for example, anhydrous diethyl ether, ethyl acetate, ethylene glycol, dimethyl ether, tetrahydrofuran, and the like. Diethyl ether and tetrahydrofuran are preferred. The carbenation reaction is conveniently started in the presence of a small amount of iodine, however, the reaction can be conducted without the presence of this activation iodine. The reaction is carried out at reflux temperature for a period of 24 to 60 hours and generally at atmospheric pressure although sub- or superatmospheric pressure may be used.

The following examples are given in illustration and not in limitation of the scope of this invention. Where parts are mentioned they are parts by weight.

*Example 1*

Heat 100 parts of 4-vinylcyclohexene at reflux temperature with about 14 parts of carbene produced in situ by the interaction of diiodomethane with zinc-copper couple in anhydrous ethyl ether solvent. Continue the heating under reflux conditions for about 48 hours. The product is an ethyl ether solution containing 3-vinyl norcarane, 4-cyclopropylcyclohexene, 3-cyclopropylnorcarane, and any excess of diiodomethane and zinc-copper couple over that needed to produce the requisite amount of carbene.

Excess of diiodomethane may be removed by adding fresh zinc-copper couple and a monolefin such as 2-methylbutene-2 to the solution followed by heating at reflux for 12 to 24 hours. This produces 1,1,2-trimethylcyclopropane which is easily removed by distillation.

The resulting solution may be freed from the residue of the zinc-copper couple by filtration or centrifugation. It should then be extracted with successive treatments with 5% hydrochloric acid, 5% sodium bicarbonate solution and water followed by drying the organic phase over anhydrous calcium chloride.

The dried solution is then distilled under vacuum to remove solvent and separate the products of the reaction. About 60% of the products of the original reaction is 3-cyclopropylnorcarane.

The 3-cyclopropylnorcarane is identified by analysis for carbon and hydrogen and by infrared spectrum which shows the typical peaks and absorption band of the cyclopropyl ring and does not contain absorption bands indicative of either the vinyl group or the cyclohexene group of the starting material.

The 3-cyclopropylnorcarane has the following physical properties.

| | |
|---|---|
| B.P. | 40° C./10 mm. |
| $d_4^{20}$ | 0.8967. |
| $n_D^{20}$ | 1.4756 |
| Heat of combustion | 18,514 B.t.u./lb. (net). |
| Heat of combustion | 139,080 B.t.u./gal. (net). |
| Hydrogen/carbon ratio | 0.133. |

Heats of combustion were obtained with a Parr oxygen bomb calorimeter on both a weight and a volume basis following the ASTM D–240–57T procedure.

The above example indicates that the 3-cyclopropylnorcarane of this invention is suitable for use in various reaction type power plants. The 3-cyclopropylnorcarane has particularly high heat of combustion on a volume basis and may therefore be advantageously employed in both jet propulsion type engines and gas-turbine engines where there is a space limitation for the storage of fuel. Thus, the 139,080 B.t.u./gal. heat of combustion of 3-cyclopropylnorcarane, permits a jet propulsion aircraft to fly considerably further than an aircraft having the same size storage tanks and using the currently available JP–6 fuel which has a heat of combustion of only 119,500 B.t.u./gal. Another advantage in utilizing the 3-cyclopropylnorcarane fuels of this invention in reaction type power plants is that this fuel has a low freezing point and a relatively high boiling point, thus possessing a broad boiling range. A broad boiling range fuel is very necessary for use in aircraft type engines where the engine is subjected to not only low temperatures, either on the ground or in the air, but also to low pressures at high altitudes. If the freezing point of the fuel is too high, the viscosity of the liquid fuel may become so great as to make supplying the fuel to the engine very difficult or almost impossible.

In operating reaction type power plants with the 3-cyclopropylnorcarane fuel of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet and gas-turbine engines, the oxidizing agent is air which is compressed either by a mechanical compressor or aerodynamically. Also, in automotive and in ship applications, the oxidizing agent will ordinarily be air. In contrast to these applications, the oxidizing agent will usually be liquid oxygen or other chemical oxidizer, for example, fuming nitric acid, hydrogen peroxide, fluorine, and the like, in guided missile and rocket applications. In some applications, a mixture of oxidizing agents will also be useful.

The 3-cyclopropylnorcarane fuel of the present invention may be blended with other materials such as gasoline, kerosene, mixtures of gasoline and kerosene, other aviation fuels, and with the present hydrocarbon jet fuels to produce an improved fuel over the presently available fuels. More particularly, the fuel described herein may be added to the present aliphatic hydrocarbon jet fuels having a heat of combustion of about 112,000 B.t.u./gal. to raise the overall heat of combustion thereof to at least about 120,000 B.t.u./gal. Moreover, the fuel described herein may be used in combination with fuel additives to improve various characteristics of the fuel, including liquid viscosity, burning characteristics, and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.0005 and 0.15. The particular fuel-air ratio used will be dependent not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) high energy fuel compositions containing 3-cyclopropylnorcarane as an essential ingredient, (2) improved methods of developing thrust, and (3) methods of operating reaction type power plants.

What is claimed is:

1. The method of developing thrust on a reaction chamber, said method comprising oxidizing a high energy fuel composition comprising, as an essential ingredient, 3-cyclopropylnorcarane in said reaction chamber to produce a mass of high temperature gases and exhausting said gases from said reaction chamber was to develop a high thrust.

2. The method of operating a reaction type power plant, said method comprising injecting a stream of an oxidizing agent and a stream of fuel comprising, as an essential ingredient, 3-cyclopropylnorcarane into the combustion chamber of said reaction type power plant, oxidizing said fuel in said combustion chamber, and exhausting the resulting gases from said combustion chamber so as to impart thrust.

3. The method of operating a jet-propulsion engine, said method comprising injecting a stream of an oxidizing agent and a stream of a fuel comprising, as an essential ingredient, 3-cyclopropylnorcarane into the combustion chamber of said jet propulsion engine, oxidizing said fuel in said combustion chamber, and exhausting the resulting gases in a rearward direction from said combustion chamber so as to impart thrust to said jet-propulsion engine.

4. The method of operating a gas-turbine engine, said method comprising injecting a stream of an oxidizing agent and a stream of a fuel comprising, as an essential ingredient, 3-cyclopropylnorcarane into the combustion chamber of said gas-turbine engine, oxidizing said fuel in said combustion chamber, and exhausting the resulting gases from said combustion chamber through a turbine to develop motive power.

5. The method of operating a turbo-jet engine, said method comprising injecting a stream of air and a stream of a fuel comprising, as an essential ingredient, 3-cyclopropylnorcarane into the combustion chamber of said turbo-jet engine, burning said fuel in said combustion chamber, exhausting the resulting gases from said combustion chamber through a turbine to expand the same and compress the air supplied to said combustion chamber, and passing the gases into the atmosphere by way of a nozzle to impart thrust to said engine.

References Cited in the file of this patent
UNITED STATES PATENTS

| | | |
|---|---|---|
| 2,769,849 | Schmerling | Nov. 6, 1956 |
| 2,771,739 | Malina et al. | Nov. 27, 1956 |
| 2,826,037 | Scott et al. | Mar. 11, 1958 |
| 2,954,411 | Hawthorne | Sept. 27, 1960 |